US008508330B1

(12) United States Patent
Godbole et al.

(10) Patent No.: US 8,508,330 B1
(45) Date of Patent: Aug. 13, 2013

(54) ADAPTIVE FILTER FOR LIGHTING ASSEMBLY CONTROL SIGNALS

(75) Inventors: Kedar Godbole, San Jose, CA (US); Chi Wang Ng, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 544 days.

(21) Appl. No.: 12/786,754

(22) Filed: May 25, 2010

Related U.S. Application Data

(60) Provisional application No. 61/180,898, filed on May 25, 2009.

(51) Int. Cl.
*G05B 23/02* (2006.01)
*G08B 5/22* (2006.01)
*H04Q 1/30* (2006.01)

(52) U.S. Cl.
USPC ........... 340/3.1; 340/3.44; 340/3.9; 340/7.32; 340/12.34

(58) Field of Classification Search
USPC ...... 340/3.1, 3.44, 3.9, 7.32, 12.34; 315/209, 315/224, 225, 307, 291; 362/249.02, 430
See application file for complete search history.

(56) References Cited

U.S. PATENT DOCUMENTS

| | | | | |
|---|---|---|---|---|
| 4,449,074 | A * | 5/1984 | Luchaco | 315/159 |
| 5,050,226 | A * | 9/1991 | Collet-Billon | 382/261 |
| 7,623,604 | B2 * | 11/2009 | Loiseau et al. | 375/350 |
| 7,667,408 | B2 * | 2/2010 | Melanson et al. | 315/209 R |
| 7,759,881 | B1 * | 7/2010 | Melanson | 315/307 |
| 7,902,769 | B2 * | 3/2011 | Shteynberg et al. | 315/291 |
| 8,193,713 | B2 * | 6/2012 | Jung et al. | 315/158 |
| 8,203,276 | B2 * | 6/2012 | Shackle et al. | 315/194 |
| 8,294,379 | B2 * | 10/2012 | Liu et al. | 315/224 |
| 8,310,166 | B2 * | 11/2012 | Nagaoka | 315/209 R |
| 2008/0031538 | A1 * | 2/2008 | Jiang et al. | 382/261 |
| 2008/0048582 | A1 * | 2/2008 | Robinson | 315/291 |

* cited by examiner

*Primary Examiner* — Nam V Nguyen

(57) ABSTRACT

A processing circuit may include a command source that receives at least one feature input control signal for a lighting fixture; and an adaptive filtering mechanism that generates a filtered control signal in response to the input control signal, wherein the adaptive filtering mechanism varies a filter function in response to at least a temporal state of the input control signal.

19 Claims, 4 Drawing Sheets

ADAPTIVE FILTER FOR LIGHTING ASSEMBLY CONTROL SIGNALS

This application claims the benefit of U.S. provisional patent application Ser. No. 61/180,898 filed on May 25, 2009, the contents of which are incorporated by reference herein.

TECHNICAL FIELD

The present disclosure relates generally to lighting systems, and more particularly to control systems for lighting fixtures.

DETAILED DESCRIPTION

Figure 1:
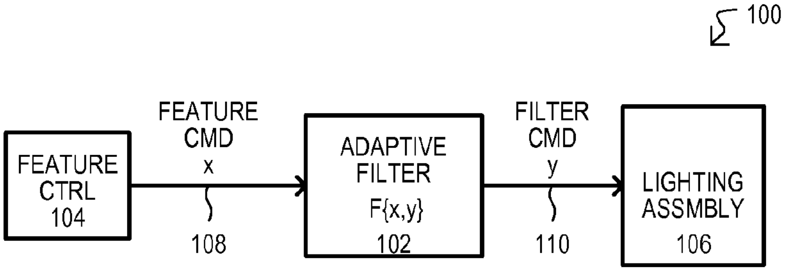
FIG. 1 is a block schematic diagram of a system according to one embodiment.

Various embodiments will now be described that show devices and methods for filtering control values applied to a lighting system. Such embodiments may adaptively filter such control values to remove unwanted features (e.g., ripple, jitter, noise) while at the same time providing fast responses to changes in input values under certain circumstances. In very particular embodiments, systems and methods may adaptively filter a dimming command for a light emitting diode (LED) lighting assembly to enable fast response to changes in dimming values while reducing or eliminating flickering that could otherwise result from jitter or other unwanted perturbations in the received dimming value.

In the particular embodiments shown, like sections will be referred to by the same reference character but with the first digit(s) corresponding to the figure number.

Referring to FIG. 1, a system according to one embodiment is shown in a block schematic diagram and designated by the general reference character 100. A system 100 may include an adaptive filter circuit 102, a feature control circuit 104, and a lighting assembly 106.

An adaptive filter circuit 102 may receive an input signal (x) on a control input 108 and adaptively filter such a value to generate a filtered signal (y) on a filter output 110. A control input 108 may thus serve as a command source for controlling one or more features of a system 100. An adaptive filter circuit 102 may change the way in which input signal (x) is filtered based on any of: changes in the input signal, the filtered signal (y), a state of the system 100, or combinations thereof. In one embodiment, an adaptive filter circuit 102 may vary its response speed based on the current input signal (x) and a current filtered signal (y). For example, an adaptive filter circuit 102 may vary the speed at which a filtered signal (y) tracks an input signal (x) based on the detection of large differences between such signals.

Adaptive filtering in the embodiment of FIG. 1 may be contrasted to static filtering, which may maintain a same signal filtering operation regardless of an input or output signal response.

A feature control circuit 104 may generate an input signal (x) suitable for controlling a feature of a lighting assembly 106. In some embodiments, a feature control circuit may be a user control interface that may be manipulated to vary input signal (x). However, in other embodiments, a feature control circuit may be an automated circuit. In one embodiment, a feature control circuit 104 may generate a dimming command that controls an intensity of light emitted by a lighting assembly 106.

A lighting assembly 106 may provide illumination having one or more features that may be controlled by a filtered signal (y). In one embodiment, a lighting assembly 106 may be an LED lighting assembly, and a filtered signal (y) may be a dimming command that may alter the intensity of LEDs within the lighting assembly 106. Alternate embodiment may include light source types other than LEDs. In the case of dimming applications (in which filtered signal (y) is a dimming command), a system 100 may provide a filtered signal suitable for light sources, like LEDs, that lack the thermal inertia present in incandescent lights. A filtered signal (y) may remove undesired transients in signal amplitude that may result in undesired flickering effects. While a filtered signal (y) may control light intensity, in other embodiments, a filtered signal (y) may control a different illumination feature, such as color mixing, as but one example.

In this way, a system may include an adaptive filter for altering a signal filtering method based on at least a state of the system.

Figure 2:
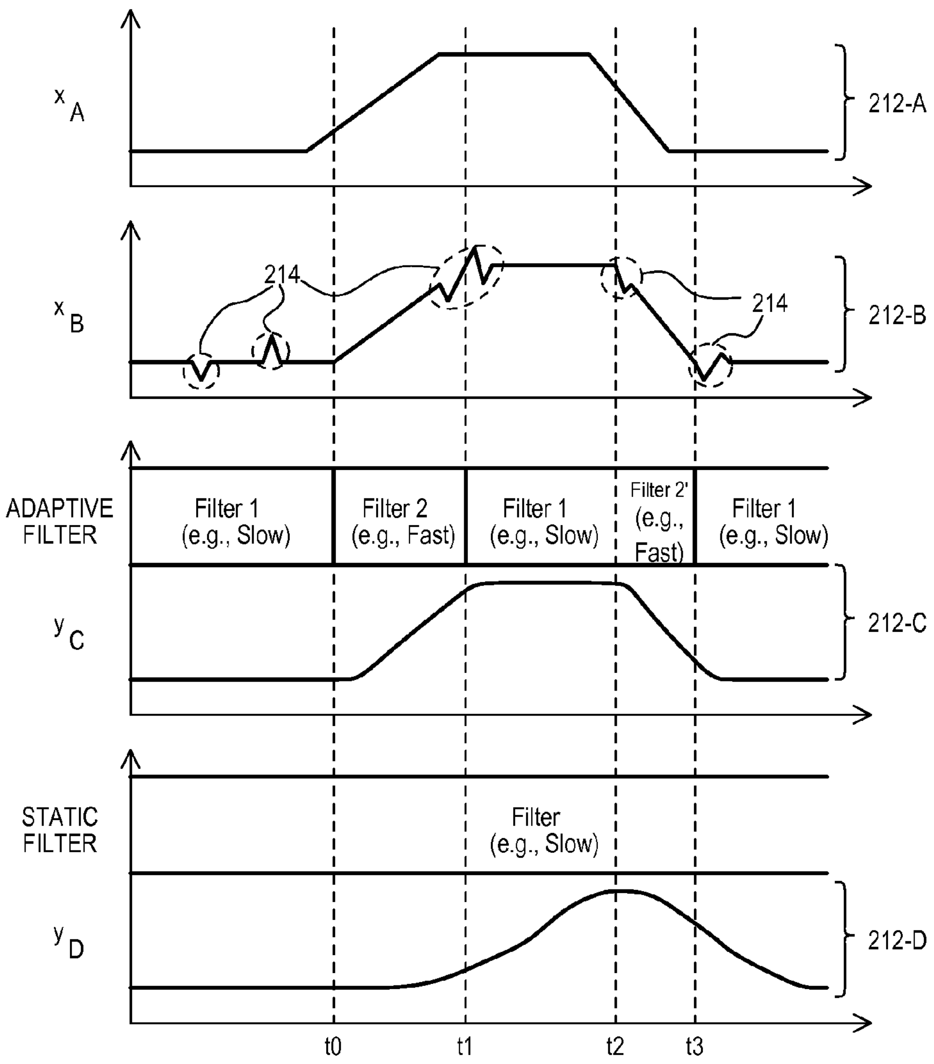
FIG. 2 is set of waveforms showing a signal filtering operation according to an embodiment.

Referring to FIG. 2, a number of waveforms are shown to demonstrate an adaptive filter response according to one very particular embodiment.

Waveform 212-A shows one example of an ideal input signal "$x_A$". An ideal input signal may represent a "perfect" correspondence with generated control values (e.g., a user input).

Waveform 212-B shows one example of an unfiltered input signal "$x_B$". An unfiltered input signal 212-B may generally follow the ideal waveform of 212-A, but also include unwanted variations (represented by features 214). Unwanted variations (e.g., 214) may arise from a conversion step in generating the input signal, noise, or other undesirable effects.

Waveform 212-C shows one example of a filtered signal "$y_C$", as well as corresponding filter response (ADAPTIVE FILTER). It is assumed that filtered signal $y_C$ is generated by adaptively filtering input signal $x_B$ according to an embodiment. Such a filtering operation will now be described in more detail.

Prior to time t0, and adaptive filter may have a slow response (Filtering 1). A slow response may prevent a filtered signal $y_C$ from tracking fast changes in input signal $x_B$. Consequently, undesirable features 214 may be reduced or eliminated.

At about time t0, in response to large changes between input signal $x_B$ and filtered signal $y_C$, an adaptive filter may switch to a fast response (Filtering 2). A fast response may allow a filtered signal $y_C$ to more rapidly track changes in input signal $x_B$ as compared to the slow response case. In some embodiments, a fast response (e.g., Filtering 2) may be sufficient to filter out some undesirable features (e.g., may be a band pass filter) while maintaining a faster tracking speed.

At about time t1, in response to little or no changes in input signal $x_B$ and filtered signal $y_c$, an adaptive filter may switch back to a slow response.

At about time t2, in response to more large changes between input signal $x_B$ and filtered signal $y_c$, an adaptive filter may switch a fast response (Filtering 2'). It is noted that a Filtering 2' may be the same filtering operation as Filtering 2 (occurring between times t0 and t1), or may different. For example, in some embodiments a filtering operation may vary according to a difference between input signal and a current filtered signal. Thus, a larger difference between a filtered output signal and an input signal, the faster the tracking speed.

At about time t3, in response to little or no changes between input signal $x_B$ and filtered signal $y_c$, an adaptive filter may switch back to a slow response.

In one particular embodiment, waveform 212-C may show one response for a system like that shown in FIG. 1.

Waveform 212-D is provided to contrast with waveform 212-C. Waveform 212-D shows one example of a filtered signal "$y_D$" generated from input signal $x_B$ with static (slow response) filtering, as opposed to adaptive filtering, as shown by waveform 212-C. Static filtering may remove undesirable features present in $x_B$, however, a response may be sluggish, introducing delay between when a user issues a command and a system (e.g., lighting fixture) responds to such a command.

In this way, adaptive filtering according to the embodiments may remove unwanted features of an input command, while providing a fast response to such an input command.

Figure 3A:
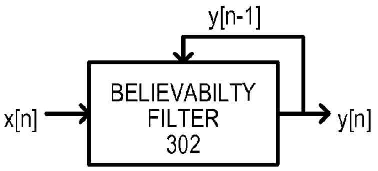
FIGS. 3A and 3B are block diagrams of filters circuits according to embodiments.

Referring now to FIG. 3A, an adaptive filter according to an embodiment is shown in a block diagram and designated by the reference character 302. An adaptive filter 302 may receive an input signal x[n] on a command source, and filter such a signal to generate a filtered signal y[n]. A filtered signal y[n] may be fed back to adaptive filter 302 as a previously filtered signal y[n−1].

An adaptive filter 302 may execute a filtering operation by modifying input signal x[n] according to a "believability" factor that may vary according to x[n] and y[n−1], x[k], y[j] where k and j are integers less than or equal to n, or combinations thereof. In another embodiment, a believability factor "a" may be calculated as a function of x[k], y[j], $x^p[k]$, $y^q[k]$ where k, j are integers less than or equal to n, p and q are integers, and $x^p[k]$, $y^q[k]$ are p- and q-order derivatives of x[k] and y[k]. Such functions are understood to include linear and non-linear combinations among other mathematical functions. It is also understood that in at least one embodiment "a" is calculated for each step of x[n] and y[n], such that a[k] is the believability factor applied at step k. It is also understood that in at least one other embodiment "a" is a continuous function not subject to discrete time steps. In such an embodiment "a" would be a temporal function of temporal variables x and y, accomplished by continuous time signal processing. Such adaptive filtering operations may reject ripple, jitter, or similar small changes on an input signal, but then switch to a fast filter response when a rapid change between x[k] or y[k] or both is detected.

In a very particular embodiment, a filtering function may be represented by $$y[n]=F_1\{y[n-1], y[n-2] \ldots y[n-k], x[n], x[n-1] \ldots x[n-j]\}$$

where $F_1$ is a function dependent upon time series samples of an input signal x[n] . . . x[n−j] and output signal y[n−1] . . . y[n−k].

Figure 3B:
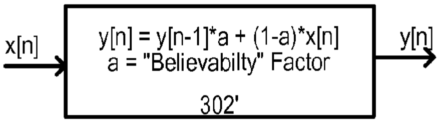

Referring to FIG. 3B, one particular example of a believability filter function 302' that may be executed by a filter like that shown in FIG. 3A is shown. In particular, a believability filter may operate according to the relationship $$y[n]=F_2\{y[n-k],x[n-j],a\}$$

where "y" is the filtered illumination control signal, "$F_2$" is a function, "x" is the input illumination control signal, n, k and j are real numbers indicating one or more time samples, and "a" is a function of any of: x taken at one or more times, y taken at one or more times, and/or a time.

In one very particular embodiment, a believability filter function 302' may have the specific form of $$y[n]=y[n-1]*a+(1-a)*x[n]$$

where y[n] is a generated value of a filtered output signal, y[n−1] is a previously generated value of a filter output signal, x[n] is a received input signal to be filtered, and "a" is a believability factor that may be a function of an input, an output signal, and time (t):

$$a=F\{x[n],y[n],t\}.$$

Alternatively, a believability factor "a" may be derived from pre-calculated coefficients.

An adaptive filter 302 shown in FIGS. 3A and/or 3B may be one particular implementation of adaptive filter circuit shown in FIG. 1. Similarly, the filtering shown in FIG. 3B may be one particular example of filtering executed by a system like that shown in FIG. 1. In this way, an adaptive filter may be a believability filter operating according to a believability factor that varies in response to both an input signal and an output filtered signal. In at least one embodiment 'a' may be selected from an array of allowed values of 'a'.

Figure 4:
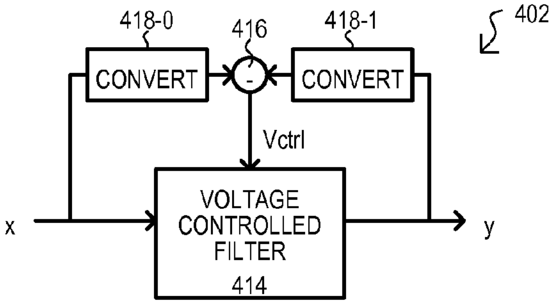
FIG. 4 is a block diagram of a filter circuit according to another embodiment.

Referring to FIG. 4, an adaptive filter according to another embodiment is shown in a block diagram designated by the general reference character 402. As in the case of FIG. 3A, an adaptive filter 402 may receive an input signal x on an niput that serves as a command source, and filter such a signal to generate a filtered signal y.

An adaptive filter 402 may include a voltage controlled filter 414, a subtractor circuit 416, and optionally, conversion circuits 418-0/1. A voltage controlled filter 414 may vary a frequency pass range according to a control signal Vctrl. In particular embodiments, a voltage controlled filter 414 may shift one or more filter poles according to an applied voltage. In an even more particular embodiment, when a control signal Vctrl indicates little or no change between a filtered signal (y) and an input signal (x), a voltage controller filter 414 may be a low pass filter that may filter out unwanted input signal events (e.g., noise, ripple, and jitter as noted above) that could cause flickering in some lighting assemblies. However, when a control signal Vctrl indicates relatively large change between a filtered signal (y) and an input signal (x), a voltage controlled filter 414 may be a band pass or high pass filter (with respect to the low pass filter), that enable a filtered signal (y) to more rapidly follow the input signal (x) as compared to the low pass filter.

A subtractor circuit 416 may generate a control signal Vctrl in response to differences between filtered signal (y) and input signal (x). A subtractor circuit 416 may operate in an analog domain and/or digital domain to arrive at control signal Vctrl.

Conversion circuits 418-0/1 may convert an input signal (x) or filtered signal (y), respectively, into a format suitable for subtractor circuit 416 to generate a control signal Vctrl representing a difference between such signals (x or y).

In a particular embodiment, a filter circuit 402 may be one version of that show as 102 in FIG. 1.

In this way, an adaptive filter may include a voltage controlled filter that may vary a filter operation in response to differences between an input signal and filtered signal.

Figure 5:
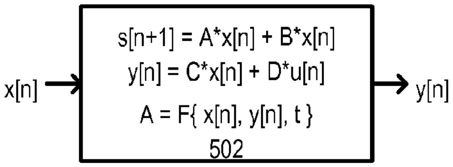
FIG. 5 is a block diagram of a filter circuit according to a further embodiment.

Referring now to FIG. 5, an adaptive filter according to another embodiment is shown in a block diagram and designated by the reference character 502. An adaptive filter 502 may receive an input signal x[n], and filter such a signal to generate a filtered signal y[n]. An adaptive filter 502 may be a state variable adaptive filter having an operation described by the state variable model $$s[n+1]=A0*s[n]+B0*x[n]+A1*s(n-1)+B1*x(n-1)+Ak*s(n-k)+Bk*x(n-k)$$

$$y[n]=C*x[n]+D*x[n]$$

where "s" is a state of the illumination system, "y" is the filtered illumination control signal, "x" is the input illumination control signal, and A, B, C, and D are matrices and k is a positive real number.

Accordingly, an adaptive filter in embodiments may respond with a state variable model that includes the terms (and may or may not include additional terms)

$$s[n+1]=A*s[n-k]+B*x[n-j]$$

$$y[n]=Cx*[n]+D*x[n]$$

where n is greater than k and j, and k and j may be the same or different.

In one embodiment, matrix A may be derived from a function that varies in response to a current input signal state and a current filtered signal state (i.e., A=function (x[n], y[n], t)). In a very particular embodiment, all matrices may be derived from different functions having the same signal state dependence (i.e., A=function1 (x[n], y[n], t)), B=function2 (x[n], y[n], t)), C=function3 (x[n], y[n], t)), and D=function (x[n], y[n], t)).

In a particular embodiment, a filter circuit 502 may be one version of that show as 102 in FIG. 1.

In this way, an adaptive filter may have a response expressible by state variable equations, where a state matrix (A) may vary in response to a current value of both an input signal and a filtered signal.

Figure 6A:
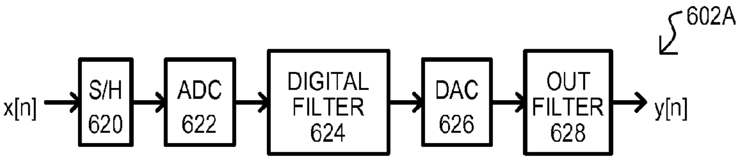
FIG. 6A is a block schematic diagram of a filter circuit according to a further embodiment.

Referring now to FIG. 6A, an adaptive filter according to yet another embodiment is shown in a block schematic diagram and designated by the general reference character 602A. An adaptive filter 602A may be a mixed signal circuit that converts an analog control signal into digital form, and digitally filters such resulting sampled values to generate a digital output value, which is subsequently converted to an analog output signal.

In the embodiment shown, an adaptive filter 602A may include a sample and hold (S/H) circuit 620, an analog-to-digital converter (ADC) 622, a digital filter 624, a digital-to-analog converter (DAC) 626, and an output filter 628. A S/H circuit 620 may periodically sample an input control signal x[n]. A DAC 626 may convert sampled values into digital values.

A digital filter 624 may generate a sequence of output digital values y[n] based on incoming digital values, as well as previously stored output values (i.e., y[n−1]). In particular embodiments, a digital filter 624 may perform digital filtering operations equivalent to any of the analog embodiments shown herein, and/or according to any of the responses described herein, or equivalents. In some embodiments, a digital filter 624 may be include logic circuits, custom designed and/or derived from programmable circuits, that may execute digital filtering functions. However, in alternate embodiments, a digital filter 624 may include one or more processors that may execute filtering operations based on sampled input values according to a series of programmable steps stored in storage media as instructions.

A DAC 626 may convert digital output signal values into analog values. An output filter 628 may filter successive DAC values to smooth a waveform and/or address any other artifacts arising from the quantized output values.

In a particular embodiment, a filter circuit 602 may be one version of that show as 102 in FIG. 1.

Figure 6B:
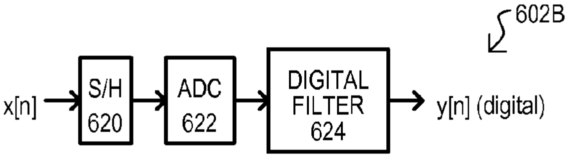
FIG. 6B is a block schematic diagram of a filter circuit according to another embodiment.

Referring now to FIG. 6B, an adaptive filter according to a further embodiment is shown in a block schematic diagram and designated by the general reference character 602B. An adaptive filter 602B has some sections like that of FIG. 6A. However, in the embodiment of FIG. 6B, a digital process may directly consume the y[n] values without a digital to analogue converter stage.

In this way, an adaptive filter may include digital filtering operations in response to an input signal and previously generated output (digitally filtered) signal values.

Figure 7:
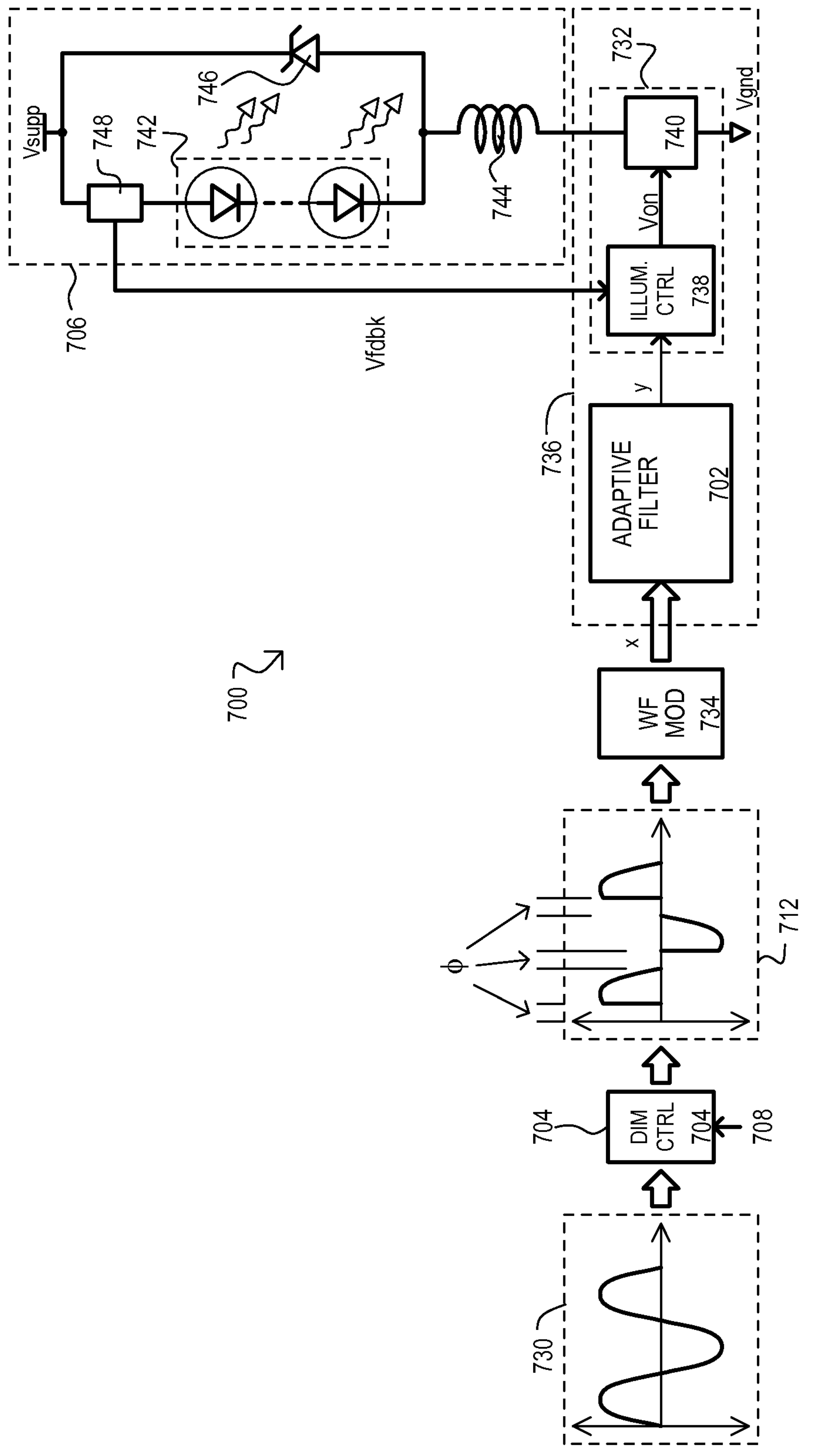
FIG. 7 is a block schematic diagram of a system according to a further embodiment.

Referring now to FIG. 7, another system according to an embodiment is shown in a block schematic diagram and designated by the general reference character 700. A system 700 may include a feature control circuit 704, a control integrated circuit 732, a lighting assembly 706, and optionally, a waveform modifier 734.

In the embodiment shown, a feature control circuit 704 may be a light dimming controller that receives an AC source signal (represented by waveform 730) and a control input 708, and in response, generates an input control signal (represented by waveform 712). In the embodiment shown, an input control signal 712 may be an AC signal that generally follows AC source signal 730 but is forced to a zero value for a duration equivalent to a phase angle $\phi$, following each zero cross over point. In one embodiment, a phase angle $\phi$ may vary from 0 to 180° depending based upon a user input 708. In one very particular embodiment, a source signal 730 may be an AC line voltage (e.g., 60 Hz), and a feature control circuit 704 may include a triode for alternating current (TRIAC), or equivalent device, that may vary a firing angle (phase angle at which it will pass an AC source signal) based on a user input (i.e., 708).

Optionally, a system 700 may include a waveform modifier circuit 734 that may modify a control signal 712 before it is applied to adaptive filter 702. In one embodiment, a waveform modifier circuit 734 may include a rectifier circuit that may rectify AC control signal 712.

Referring still to FIG. 7, a control integrated circuit (IC) 732 may receive an input control signal 712, and in response, control a current flowing through an LED lighting assembly 706 according to filtered input control signal. In the embodiment shown, control IC 732 may include an adaptive filter circuit 702 and an LED control circuit 736. An adaptive filter circuit 702 may be a filter circuit according to any of the embodiments shown herein, or equivalents. In the embodiment shown, an adaptive filter circuit 702 may filter out undesirable features (e.g., jitter, ripple) that would otherwise arise from an imperfect input control signal 712 or its imperfect interpretation.

An LED control circuit 736 may include an illumination control circuit 738 and a current control device 740. An illumination control circuit 738 may turn a current control device 740 on and off based on filtered signal (y) and a feedback signal (Vfdbk) received from lighting assembly 706. An illumination control circuit 738 may have various responses, including hysteresis with respect to feedback signal (Vfdbk)

as well as other circuits and/or operations, such as color mix and control, for example. In particular embodiments, hysteresis limits for controlling a current control device 740 may be lowered and raised in response to filtered dimming control signal (y) to thereby establish an intensity value for a lighting assembly. A current control device 740 may intermittently draw current through lighting assembly 706 in response to a control signal Von.

A lighting assembly 706 may include one or more LEDs 742, an inductor 744, a fly back diode 746, and a feedback tap circuit 748. LEDs 742 may emit light when a current is drawn through them. An intensity of LEDs 742 may be varied by increasing or decreasing such a current in accordance with filtered signal (y) from adaptive filter 702. Inductor 744 and flyback diode 746 may allow lighting assembly 706 to operate in a "buck" type regulator fashion, alternately sourcing current through current control device 740 and back through flyback diode to maintain a current through LEDs 742. A feedback tap circuit 748 may generate a feedback value (Vfdbk) reflecting a current flowing through LEDs 742.

Of course, system 700 with lighting assembly 706 shows but one embodiment. For example, alternate embodiments may include different types of lighting assemblies.

In this way, an adaptive filter may filter a dimming signal generated by altering an AC waveform to control an intensity of an LED lighting assembly.

Figure 8:
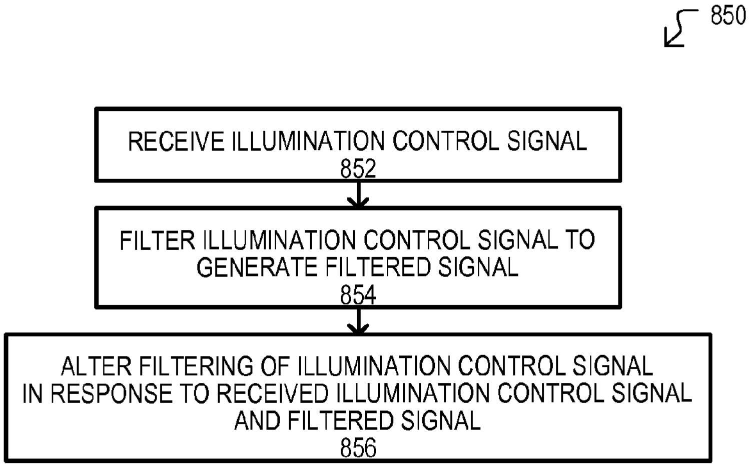
FIG. 8 is a flow diagram of a method according to an embodiment.

Referring now to FIG. 8, a method according to one embodiment is shown in a flow diagram and designated by the general reference character 850. A method 850 may include receiving an illumination control signal (box 852). Such an action may include receiving a signal that controls a feature of a lighting assembly. Such a signal may be an AC signal, a DC signal, or a sequence of digital values. In very particular embodiments, such a signal may be dimming control signal that controls an intensity of one or more lighting assemblies.

A received illumination control signal may be filtered to generate a filtered signal (box 854). Such an action may include initially filtering the illumination control signal according to a starting filtering function. In a very particular embodiment, such an action may include a low pass filter to remove unwanted jitter, ripples, noise, or similar features on a received illumination control signal.

A method 850 may also alter a filtering of the illumination control signal in response to a received illumination control signal and a filtered signal (box 856). Such an action may include filtering according to the various embodiments shown above, including but not limited to, a "believability filter" or state variable filter.

In this way, a method may adaptively filter an illumination control signal based on a filtered signal an input signal.

Figure 9:
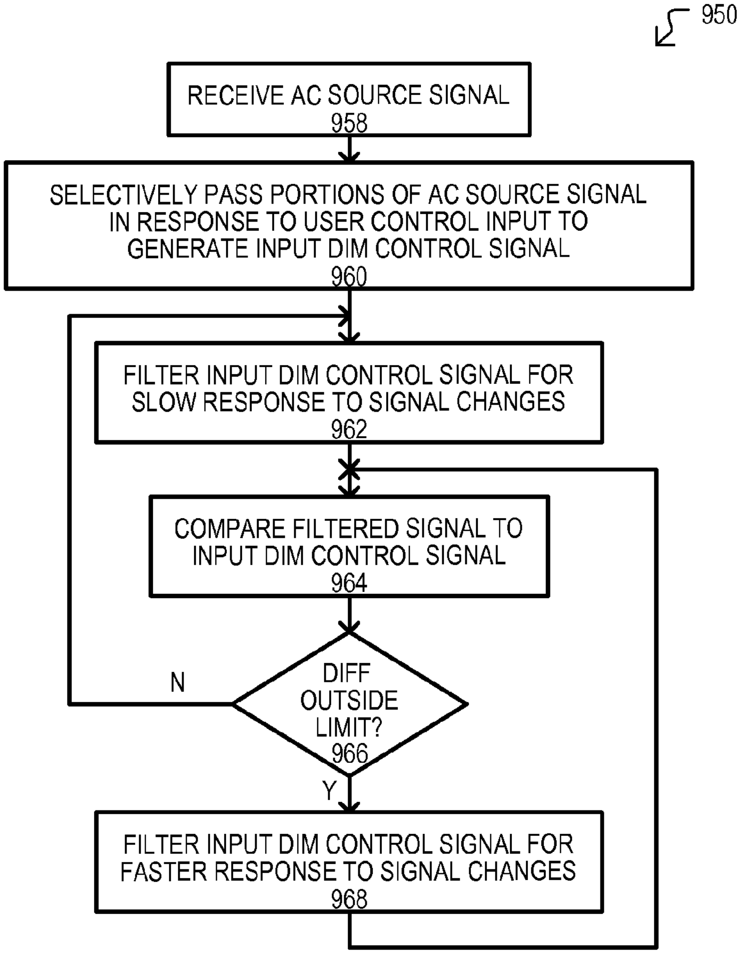
FIG. 9 is a flow diagram of another method according to an embodiment.

Referring now to FIG. 9, another method according to an embodiment is shown in a flow diagram and designated by the general reference character 950. A method 950 may include receiving an AC source signal (box 958). Such an action may include receiving a line voltage signal. Portions of such an AC source signal may be selectively passed in response to a user control, to thereby generate an input diming control signal (box 960). In particular embodiments, such an action may include altering a firing angle of TRIAC or similar device in response to a user input.

Referring still to FIG. 9, a method 950 may also include filtering an input dim control signal for slow responses to signal changes (box 962). Such an action may remove jitter and/or ripples resulting from a variable firing in the event a phase angle is varied in an AC signal to generate the dim control signal. A filtered signal may be compared to a received dim control signal (box 964). Such an action may include various signal conversion steps to enable a comparison between the two signals.

If a difference between the filtered signal and the input signal is within some limit (N from 966), a method 950 may continue a slow response filtering of the dim control signal. However, if a difference between the filtered signal and the input signal is outside of some limit (Y from 966), a method 950 may filter an input dim control signal for a faster response to signal changes (box 968). It is noted that filtering response may be dynamic, allowing a faster response for a greater difference.

In this way, a method may adaptively filter a dimming command allowing faster filter responses to larger changes between an input dimming signal and its filtered form.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A processing circuit comprising:

a command source configured to receive at least one feature input control signal for a lighting fixture; and an adaptive filtering mechanism configured to generate a filtered control signal in response to the input control signal, wherein the adaptive filtering mechanism is configured to generate the filtered control signal according to a relatively slower speed of response to the feature input control signal responsive to a first difference between a filtered control signal value and a feature input control signal value and generate the filter control signal according to a relatively faster speed of response to the feature input control signal responsive to a second difference between the filtered control signal value and the feature input control signal value.

2. The processing circuit of claim 1, wherein: the adaptive filtering mechanism varies its characteristics as a function of a rate of change of at least one of the signals.

3. The processing circuit of claim 1, wherein: the adaptive filtering mechanism varies a speed of response to the input signal according to a believability factor that is a function of at least the input control signal and the filtered control signal.

4. The processing circuit of claim 1, wherein: the adaptive filtering mechanism switches between filtering at least two different frequency ranges.

5. The processing circuit of claim 1, wherein: the adaptive filtering mechanism comprises a state variable filter.

6. A lighting system comprising:

at least one lighting device configured to vary an illumination feature in response to a filtered control signal;

a control signal source configured to generate an input control signal to change the illumination feature; and an adaptive filtering mechanism configured to vary a filtering operation in response to the current illumination feature and the input control signal to generate the filtered control signal, wherein the adaptive filtering mechanism is configured to generate the filtered control signal according to a relatively slower speed of response to the input control signal responsive to a first difference between a filtered control signal value and an input control signal value and generate the filter control signal according to a relatively faster speed of response to the input control signal responsive to a second difference between the filtered control signal value and the input control signal value.

7. The lighting system of claim 6, wherein:

the illumination feature is intensity; and the input control signal is a dim command that varies an intensity of light emitted from the lighting device.

8. The lighting system of claim 6, wherein: the control signal source is a dimming controller that selectively passes only a portion of an alternating current (Ae) signal to generate the input control signal.

9. The lighting system of claim 6, wherein: the at least one lighting device comprises a light emitting diode (LED) lighting fixture having at least one LED element arranged in series with an inductor and a control switch, the control switch being activated in response to the filtered control signal.

10. A method comprising: varying a filtering function applied to an input illumination control signal to generate a filtered illumination control signal in response to the received illumination control signal and at least a current state of an illumination system, wherein the varying of the filtering function includes generating the filtered illumination control signal according to a relatively slower speed of response to the illumination control signal responsive to a first difference between a filtered illumination control signal value and an illumination control signal value and generating the filtered illumination control signal according to a relatively faster speed of response to the illumination control signal responsive to a second difference between the filtered illumination control signal value and the illumination control signal value.

11. The method of claim 10, wherein: varying the filtering function includes increasing a speed of a filter response based on a difference between a desired state of the illumination system represented by the input illumination control signal and the current state of the illumination system.

12. The method of claim 10, wherein: the received illumination control signal is a dimming command and the state of the illumination system is an intensity of light emitting diode (LED) light sources of the system.

13. The method of claim 10, wherein: varying the filtering function includes generating the filtered illumination control signal according to a relationship $$y[n]F1[y[n-1], y[n-2] \ldots y[n-k], x[n], x[n-1] \ldots x[n-j]\}$$

where "y" is the filtered illumination control signal, "x" is the input illumination control signal and is selected from the group consisting of: a scalar value and vector value, "F 1" is a function, "n−1" and "n" are time values at samples n, n−1 etc, and where j and k are distinct positive numbers.

14. The method of claim 10, wherein: varying the filtering function includes generating the filtered illumination control signal based on a believability function that includes the relationship $$y[n]F2[y[n-k],x[n-j],a]$$

where "y" is the filtered illumination control signal, "F2" is a function, "x" is the input illumination control signal, n, j and k are real numbers indicating one or more time samples, and "a" is a function of any of: at least temporal value of x, at least one temporal value of y, or time.

15. The method of claim 14, wherein: the parameter a is chosen from a set of pre calculated coefficients.

16. The method of claim 10, wherein: varying the filtering includes generating the filtered illumination control signal according to a state variable function that includes the form $$s[n+1]=A^*s[n-k]+Bx[n-j]$$

$$y[n]=C^*x[n]+D^*x[n]$$

where "s" is a state of the illumination system, "y" is the filtered illumination control signal, "x" is the input illumination control signal, and A, B, C, and D are matrices and n, k and j are real numbers indicating one or more time samples of their respective values.

17. The method of claim 16, wherein: at least one of the matrices is a function of the input illumination control signal and a current filtered illumination control signal.

18. The method of claim 10, further including: generating the input illumination control signal by altering a phase angle <1>, where <I> is a portion a 180 degree half cycle of an AC signal, angle <I> starting at a zero cross over point of the AC signal.

19. The method of claim 10, further including: generating the input illumination control signal with a lighting dimmer switch.

* * * * *